(12) United States Patent
Zarras et al.

(10) Patent No.: US 9,273,211 B1
(45) Date of Patent: Mar. 1, 2016

(54) ENHANCED BIOMIMETIC COATINGS FOR ON-DEMAND ADHESION OF A CONDUCTIVE POLYMER APPLIQUE COATING

(71) Applicant: SECRETARY OF DEPARTMENT OF NAVY, Washington, DC (US)

(72) Inventors: Peter Zarras, Ridgecrest, CA (US); John D Stenger-Smith, Ridgecrest, CA (US); William Lai, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 627 days.

(21) Appl. No.: 13/689,381

(22) Filed: Nov. 29, 2012

Related U.S. Application Data

(60) Provisional application No. 61/564,680, filed on Nov. 29, 2011.

(51) Int. Cl.
*C25D 9/02* (2006.01)
*C09D 5/08* (2006.01)
*C23C 28/00* (2006.01)

(52) U.S. Cl.
CPC . *C09D 5/08* (2013.01); *C23C 28/00* (2013.01); *C25D 9/02* (2013.01)

(58) Field of Classification Search
CPC ............. C09D 5/08; C23C 28/00; C25D 9/02
See application file for complete search history.

*Primary Examiner* — Kishor Mayekar
(74) *Attorney, Agent, or Firm* — Charlene A. Haley

(57) ABSTRACT

A film, coating, appliqué and method to eliminate paint removal via hazardous methods and maintain effective corrosion inhibition via employment of a re-useable coating. Embodiments of the invention generally relate to a multilayer film having a first layer constructed of at least one electroactive polymer, a second layer constructed of at least one flexible electrically-conductive solid, and a third layer constructed of at least one inert polymer.

11 Claims, 1 Drawing Sheet

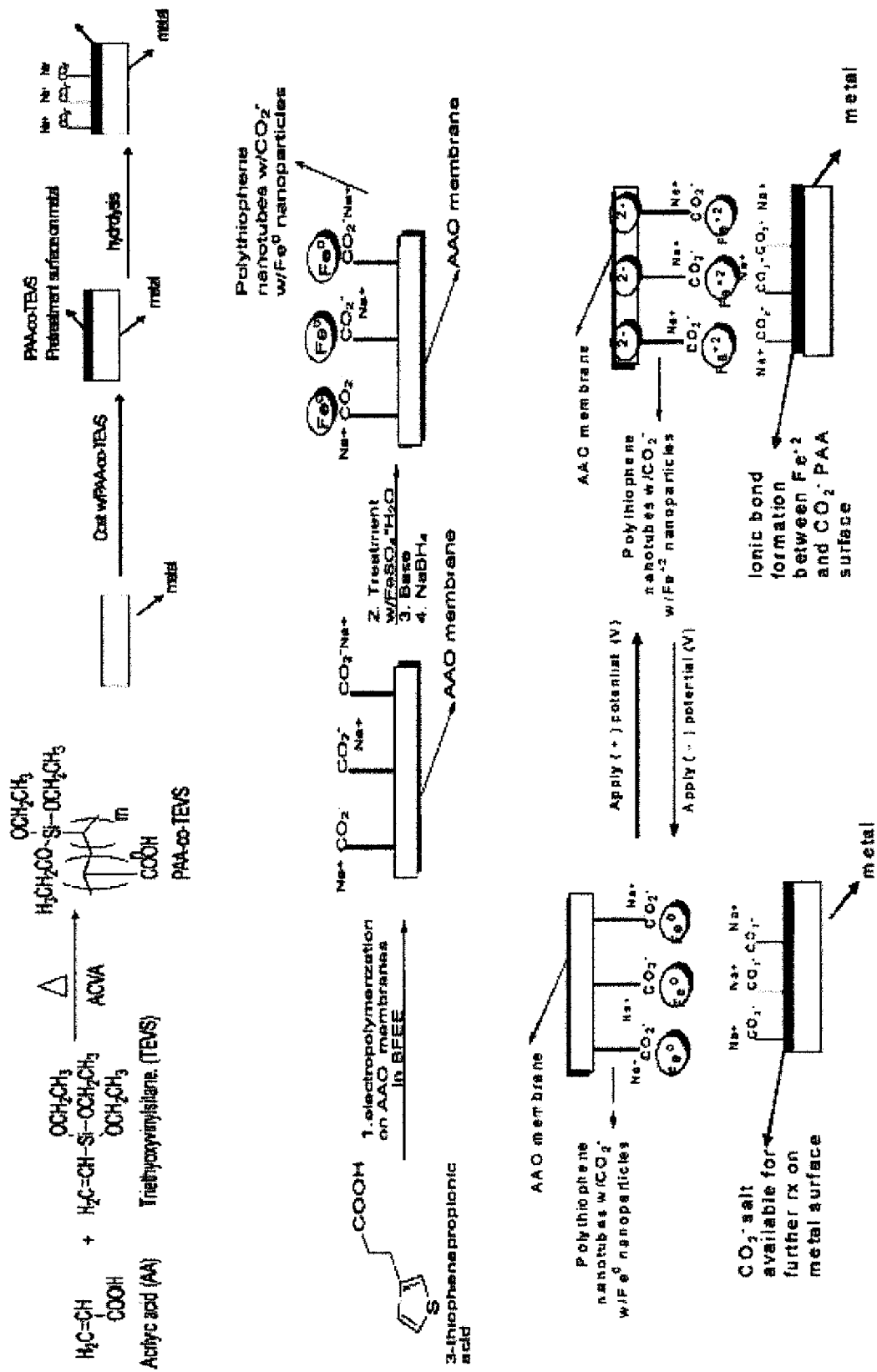

ENHANCED BIOMIMETIC COATINGS FOR ON-DEMAND ADHESION OF A CONDUCTIVE POLYMER APPLIQUE COATING

CROSS-REFERENCE TO RELATED APPLICATIONS

This is a non-provisional patent application, claiming the benefit of, parent application Ser. No. 61/564,680 filed on Nov. 29, 2011, whereby the entire disclosure of which is incorporated hereby reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to a method to eliminate paint removal via hazardous methods and maintain effective corrosion inhibition via employment of a re-useable coating.

BRIEF DESCRIPTION OF THE DRAWING(S)

FIG. 1 is a flow chart showing an "on-demand" adhesion process, according to embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

The invention generally relates to a method to eliminate paint removal via hazardous methods and maintain effective corrosion inhibition via employment of a re-useable coating.

New coating materials that have improved lifetimes, cost effectiveness and comply with existing and future environmental regulations are of interest to the Navy warfighter. The coating systems will positively impact the Naval S&T Focus area for affordability, maintainability and reliability in cost reduction and reduced failure. This technology provides new innovative coating for environmental needs which will positively impact the Naval S&T FOCUS area for affordability, maintainability and reliability in cost reduction and reduced failure.

The Department of Defense (DoD) relies on multiple-component protective coating systems to maintain operational readiness of aircraft and ground vehicles. These coatings which are used on ships, aircraft and combat vehicles perform a variety of functions including protection from moisture, heat, corrosion protection from salt spray and other chemicals. These paints must be removed from the metal to allow detail surface in sections, rework or repair operations to remove failed paint systems and rework metal parts that are damaged due to corrosion. A method to eliminate paint removal via hazardous methods and maintain effective corrosion inhibition via employment of a re-useable coating would provide the DoD with an attractive alternative to current coating technologies. A biomimetic approach to develop this coating is being developed and will focus on duplicating the unique "on-demand" adhesion properties of the gecko's foot pad. Rather than rely on the weak van der Waals forces of the geckos foot pad, strong ionic bonds will be utilized for this project. Our study will provide for an "on-demand" adhesion and future corrosion inhibiting coating system on various substrates such as metals (aluminum and steel) and composites. This new material will be a re-useable and environmentally benign conductive polymer appliqué (CPA) coating.

The Gecko foot pads are sticky because they feature an extraordinary hierarchy of structure that functions as a smart adhesive. Gecko foot pads (Russell 1975) operate under perhaps the most severe conditions of any adhesives application. Geckos are capable of attaching and detaching their adhesive toes in milliseconds (Autumn et al. 2005 (in press)) while running with seeming reckless abandon on vertical and inverted surfaces, a challenge no conventional adhesive is capable of meeting (Autumn, K. 2006. Properties, principles, and parameters of the gecko adhesive system. In Smith, A. and J. Callow, Biological Adhesives. Springer Verlag).

The first phase of this program involves preparing the CPA nanotube arrays and pretreatment polyanionic coating. The preparation of the polyacrylicacid (PAA) pretreatment film will be prepared via two methods: a) commercially available PAA and organic silanes for the pretreatment step and b) co-polymerize acrylic acid with triethyoxyvinylsilane (TEVS) (as adhesion promoter) using thermal initiators (e.g. 4,4'-azobis(4-cyanovaleric acid, ACVA). The characterization of the PAA film will be determined via Fourier transform infrared spectroscopy (FTIR) examining the carbonyl group at 1740-1700 cm-1 and subsequent neutralization of the carboxylic acid (COOH) to the carboxylic acid salt ($CO_2$) at 1695-1540 cm-1. The PAA-co-TEVS once deposited in its neutral form will have an extended conformation with COOH groups on the surface of the film available for subsequent neutralization to the $CO_2$-salt.

The preparation of the CPA nanotube arrays are based on aniline, pyrrole and thiophene monomers and polymerized. The CPA will be functionalized with anionic groups (e.g. carboxylic or sulfonic) for ionic attachment of the iron nanoparticles. The template synthesis of the CPA nanotube arrays including carboxylic acid groups will follow the procedure of Shi et al (Fu, M., Zhu, Y. Tan, R., and Shi, G., Adv. Mater., 2001, 13(4), 1055). A hard template or template-free methods will be used to fabricate the CPA nanotube arrays. The template method will include of microporous alumina membranes having a thickness of about 60 microns and pore diameters of 20 to 200 nm. The CPA nanotube arrays will be synthesized via electrochemical polymerization of the monomer in boron trifluoride diethtyl etherate (BFEE) using an anodic aluminum oxide (AAO) membrane or polycarbonate for improved flexibility.

After purification of the CPA nanotubes, attachment of the FeO nanoparticles to the CPA nanotube arrays will be accomplished via a liquid-phase reaction utilizing sodium borohydride ($NaBH_4$) as the reducing agent. The preparation of the FeO nanoparticles under ambient atmosphere will result in a thin film of iron oxide (~1-2 nm) on the surface of the nanoparticles. This thin iron oxide layer will provide sites for ionic bond formation between the iron oxide surface and the $CO_2$-groups on the CPA nanotube arrays. A typical procedure for preparing the FeO nanoparticles (10-30 nm) involves agitation of $FeSO_4*H_2O$ and support material (in our case CPA nanotube arrays) in deionized water (DI water). This is followed by adjusting the pH with sodium hydroxide, reducing the oxidized Fe salts to FeO using poly thiophene as the CPA compound with the sodium borohydride reagent. The $NaBH_4$ reducing agent is a mild reducing agent and will not adversely affect the CPA. The CPA nanotube arrays will contain FeO at the ends of the aligned CPA nanotubes for direct ionic attachment to the PAA pretreatment film after oxidation to $Fe^{+2}$. This synthesis will enable the development of a unique appliqué that can undergo redox chemistry to produce strong ionic bonds between the PAA pretreatment film and the CPA.

The next phase of the program tests the reversibility of the CPA film. The CPA nanotube arrays film will be placed directly on top of the PAA pretreated film. Adhesion of the CPA and the PAA pretreatment will require a potential across the films to oxidize the FeO nanoparticles to $Fe^{+2}$ and concurrent reduction of the AAO membrane to maintain charge balance. The oxidized $Fe^{+2}$ ions will adhere very strongly through ionic bond formation to the PAA pretreatment film ($CO_2$-groups). The adhesion properties of the CPA film will be quantified and the process will be reversible to allow for easy release and adhesion of the appliqué onto any pretreated surface.

Template-free methods do not use any hard surfaces just direct polymerization onto the surface without any pre-fabrication method. Template free is also called self-assembled. The name describes the process. While polymerizing/fabricating, it just aligns and orders on its own not requiring anything extra or special.

The zero-valent iron particles on the conductive polymer comprise the appliqué, the pretreatment is to provide a surface for ionic bonding between two coatings. In embodiments, the metal substrate is not part of the appliqué. In other embodiments, the metal substrate may be part of the appliqué.

In embodiments, the metal has the pretreatment on it to allow for ionic bonding between the appliqué and the pretreatment coating/metal surface. In embodiments, the metal is the layer in the schematic below, but an alternative embodiment, the "active layers" are part of the appliqué. The backbone polymer can be anchor points for the anionic groups. In theory, any polymer/material can be made into a coating and graft on anionic groups to work as intended coatings/appliqués.

Embodiments of the invention generally relate to methods for making a conductive polymer film or coating including, preparing conductive polymer nanotube arrays and pretreating a polyanionic coating by hydrolysis producing a polyanionic coating having at least one anionic group, testing the pretreated polyanionic coating in its neutral form to determine whether there is an extended conformation with COOH groups on the surface of the coating which is available for subsequent neutralization to the anionic group, fabricating the conductive polymer appliqué nanotube arrays by electropolymerizing of the polyanionic coating having a anionic group with aniline, pyrrole, and/or monomers in conductive medium using an anodic aluminum oxide (AAO) membrane or polycarbonate to improve flexibility, purifying the fabricated arrays, and attaching FeO nanoparticles to the arrays via a liquid-phase reaction utilizing sodium borohydride ($NaBH_4$) as the reducing agent producing an iron oxide thin film on the surface of the nanoparticles to provide sites for ionic bonding between the iron oxide surface and the anionic group(s) on the arrays, where the arrays having FeO at the ends of aligned the nanotubes to achieve direct attachment to the pretreated coating/film after oxidation to $Fe^{+2}$ to produce appliqués that can undergo redox chemistry with strong ionic bonds.

In embodiments, pretreating a polyanionic coating is prepared by utilizing poly(acrylic acid)(PAA) and at least one organic silane. In other embodiments, pretreating a polyanionic coating is prepared by utilizing a co-polymerize acrylic acid with at least one adhesion promoter using at least one thermal initiator. In embodiments, at least one adhesion promoter is selected from the group consisting of triethyoxyvinylsilane (TEVS) and saline-based adhesion promoters. In embodiments, at least one thermal initiator is selected from the group consisting of 4,4'-azobis(4-cyanovaleric acid) (ACVA), 2,2'-azobis(-methyl propionitrile) (AIBN), 1,1'-azobis(cyclohexanecarbonitrile), and any thermal initiators.

In embodiments, the thin film has a thickness ranging from 1 μm to about 2 μm. Embodiments further include testing the reversibility of the appliqué by placing the array film directly on top of the pretreated film to form an array film or coating complex and applying an electrical potential across the array/film complex to oxidize the FeO nanoparticles to the $Fe^{+2}$ and concurrent reduction of the AAO membrane to maintain charge balance which will promote a strong ionic bond adhesion of the array film or coating, where the array film or coating exhibits reversible properties permitting for easy release and adhesion to any pretreated surface.

In embodiments, the anionic group(s) is $CO_2$-salt(s). In embodiments, at least one conductive medium includes at least one solvent or electrolyte. In embodiments, at least one solvent or electrolyte is boron trifluoride diethyl etherate (BFEE). In embodiments, fabricating the conductive polymer appliqué nanotube arrays by electropolymerizing of the polyanionic film or coating having a anionic group with aniline, pyrrole, and/or monomers in conductive medium using an anodic aluminum oxide (AAO) membrane or polycarbonate to improve flexibility and is processed via a template assisted method or a template-free method.

Another aspect of the invention generally relates to protective appliqués including, a multilayer film having a first layer constructed of at least one polymer, a second layer constructed of at least one flexible electrically-conductive solid, and a third layer constructed of at least one inert polymer, where the first layer of the film is associated with a metal substrate, where a positive (or negative) electrical potential is applied between the metal substrate and the second layer oxidizing (or reducing) the first layer, where the first layer in the reduced state has low adhesion to the metal substrate and where the appliqué has low peel strength on the metal substrate, where the first layer in the oxidized state has high adhesion to the metal substrate and where the appliqué has high peel strength on the metal substrate, where the third layer is resistant to harsh operating environments, non-corrosive, and where the appliqué has reversible properties permitting for easy release and adhesion to any pretreated surface.

In embodiments, the first layer is at least one electro-active polymer selected from the group consisting of carboxylic-functional polypyrrole, ferrocene-functionalized polypyrrole, polyaniline, polythiophene, poly(phenylene vinylene), and other conductive polymer systems. In embodiments, the second layer is selected from the group consisting of carbon nanotubes, polymer filled with metal powder, p-doped π-conjugated polymer, and n-doped π-conjugated polymer.

Current EPA Restrictions and Methods for Removing Paint from Military Equipment:

1. (a). The Environmental Protection Agency, for National Emission Standards for Hazardous Air Pollutants (NESHAP), Sep. 17, 2007 40 CPR 63 Subpart HHHHHH; Montgomery D. C., Anodizing, Plating & Surface Finishing, 94(11), 12 (2007).

2. Rehm, H-J., and Spei, B., Aqueous Alkaline Paint Strippers, U.S. Patent 0114327A1, Jun. 19, 2003 (Henkel Corporation).

3. Pole, P., PhotoStrip-An Environmentally Friendly Method of Removing Paint from Aircraft and its Components, 4th International Aircraft Corrosion Workshop, Solomon, Island, Md., August 2000.

Previous Work on Appliqué Technology/Gecko Adhesion Architecture:

1. Davis, G. D., Vargo, T., and Deason, D., Materials Performance: Coatings and Linings, 46(6), 38 (2007), 2. Sitti, M., Fearing, R. S., J. Adhes, Sci. Technol., 17, 1055 (2003).

3. Qu, L., Dai, L., Stone, M., Xia, Z., Wang, Z. L., Science, 322, 238 (2008).

4. Lu, G., Hong, W., Tong, L., Bai, H., Wei, Y and Shi, G., ACS Nano, 2(11), 2342 (2008), Previous Work on Adhesion and Corrosion Inhibition Using CPs:

1. Kinlen, P., Graham, C. R., and Ding, Y., ACS Polym. Prep., 45(2), 146-147 (2004).

2. Kinlen, P. J., Menon, V., and Ding, Y., J. Electrochem. Soc., 146, 3690 (1999).

An embodiment of an "on-demand" adhesion process in shown in FIG. 1.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they tall within the breadth and scope of the claims here appended.

What is claimed is:

1. A method for making a conductive polymer coating or film, comprising:
    preparing conductive polymer appliqué nanotube arrays having ends and pretreating a polyanionic coating or film by hydrolysis producing a polyanionic coating or film having at least one anionic group;
    testing said pretreated polyanionic coating or film in its neutral form to determine whether there is an extended conformation with COOH groups on a surface of said coating or film which is available for subsequent neutralization to said anionic group;
    further preparing said conductive polymer appliqué nanotube arrays by electropolymerizing of said pretreated polyanionic coating or film having the anionic group with aniline, pyrrole, and/or thiophene monomers in at least one conductive medium using an anodic aluminum oxide (AAO) membrane or polycarbonate to improve flexibility;
    purifying said fabricated arrays; and
    attaching FeO nanoparticles to said purified conductive polymer appliqué nanotube arrays via a liquid-phase reaction utilizing sodium borohydride ($NaBH_4$) as a reducing agent producing an iron oxide thin film or coating on a surface of said nanoparticles to provide sites for ionic bonding between an iron oxide surface and said anionic group(s) on said purified arrays, wherein said purified arrays having FeO at said ends of aligned said nanotubes array to achieve direct attachment to said pretreated polyanionic coating or film after oxidation to $Fe^{+2}$ to produce appliqués that can undergo redox chemistry with strong ionic bonds.

2. The method according to claim 1, wherein said pretreating a polyanionic coating or film is prepared by utilizing poly(acrylic acid)(PAA) and at least one organic silane.

3. The method according to claim 1, wherein said pretreating a polyanionic coating or film is prepared by utilizing a co-polymerize acrylic acid with at least one adhesion promoter using at least one thermal initiator.

4. The method according to claim 1, further comprising at least one adhesion promoter is selected from the group consisting of triethyoxyvinylsilane (TEVS) and saline-based adhesion promoters.

5. The method according to claim 1, further comprising at least one thermal initiator is selected from the group consisting of 4,4'-azobis(4-cyanovaleric acid (ACVA)), 2,2'-azobis (-methyl propionitrile) (AIBN), and 1,1'-azobis(cyclohexanecarbonitrile).

6. The method according to claim 1, wherein said attached conductive polymer appliqué nanotube arrays are a thin film having a thickness ranging from 1 µm to about 2 µm.

7. The method according to claim 1, further comprising testing the reversibility of said attached appliqué array by:
    placing said attached conductive polymer applique nanotube array directly on top of said pretreated coating or film to form an array coating or film complex; and
    applying an electrical potential across said array coating or film complex to oxidize said FeO nanoparticles to said $Fe^{+2}$ and concurrent reduction of said AAO membrane to maintain charge balance which will promote a strong ionic bond adhesion of said array coating or film complex, wherein said array coating or film complex exhibits reversible properties permitting for easy release and adhesion to a pretreated surface.

8. The method according to claim 1, wherein said anionic group(s) is $CO_2$-salt(s).

9. The method according to claim 1, wherein said at least one conductive medium includes at least one solvent or electrolyte.

10. The method according to claim 9, wherein said at least one solvent or electrolyte is boron trifluoride diethyl etherate (BFEE).

11. The method according to claim 1, wherein said attached conductive polymer appliqué nanotube arrays is processed via a template assisted method or a template-free method.

* * * * *